US012632731B2

(12) United States Patent
Nishikawa et al.

(10) Patent No.: US 12,632,731 B2
(45) Date of Patent: May 19, 2026

(54) DEVICE FOR MACHINE LEARNING MOLECULAR DYNAMICS USING ERROR FUNCTION

(71) Applicant: KABUSHIKI KAISHA TOSHIBA, Tokyo (JP)

(72) Inventors: Takeichiro Nishikawa, Yokohama (JP); Gen Li, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 521 days.

(21) Appl. No.: 18/457,601

(22) Filed: Aug. 29, 2023

(65) Prior Publication Data

US 2024/0311632 A1      Sep. 19, 2024

(30) Foreign Application Priority Data

Mar. 17, 2023      (JP) ................................. 2023-042587

(51) Int. Cl.
*G06F 21/00* (2013.01)
*G06N 3/08* (2023.01)
(52) U.S. Cl.
CPC ...................................... *G06N 3/08* (2013.01)
(58) Field of Classification Search
CPC   G06N 3/08; G06N 7/01; G06N 3/063; G06N 20/00; G06N 3/042; G06N 3/09; G16C 20/70; G16C 10/00; G16C 20/40; G16C 60/00
See application file for complete search history.

(56) References Cited

U.S. PATENT DOCUMENTS

| | | | |
|---|---|---|---|
| 12,211,588 B1 * | 1/2025 | Aithani ................. | G16B 40/20 |
| 2020/0365236 A1 | 11/2020 | Park et al. | |
| 2021/0081505 A1 | 3/2021 | Bai et al. | |
| 2021/0217501 A1 | 7/2021 | Matsushita | |
| 2022/0207370 A1 | 6/2022 | Motoki | |
| 2023/0086384 A1 * | 3/2023 | Smith ................... | G16H 50/30 705/2 |

(Continued)

FOREIGN PATENT DOCUMENTS

| | | |
|---|---|---|
| CN | 115527626 A | 12/2022 |
| JP | 202111143 A | 8/2021 |

(Continued)

OTHER PUBLICATIONS

Office Action issued on Sep. 9, 2025, in corresponding Japanese Application No. 2023-042587, 7 pages.

(Continued)

*Primary Examiner* — William A Corum, Jr.
(74) *Attorney, Agent, or Firm* — Maier & Maier, PLLC

(57) ABSTRACT

According to an embodiment, an information processing device includes one or more hardware processors configured to: set an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and learn the machine learning model using the error function.

16 Claims, 12 Drawing Sheets

(56)         References Cited

U.S. PATENT DOCUMENTS

| | | |
|---|---|---|
| 2023/0360808 A1 | 11/2023 | Park et al. |
| 2024/0050975 A1 | 2/2024 | Lee et al. |
| 2024/0153596 A1* | 5/2024 | Ye .......................... G16C 20/20 |

FOREIGN PATENT DOCUMENTS

| | | |
|---|---|---|
| WO | 2022060177 A1 | 3/2022 |
| WO | 2022060179 A1 | 3/2022 |
| WO | 2023015247 A1 | 2/2023 |

OTHER PUBLICATIONS

Behler, "Constructing High-Dimensional Neural Network Potentials: A Tutorial Review", International Journal of Quantum Chemistry, Mar. 6, 2015, vol. 115, No. 16, pp. 1032-1050.

* cited by examiner

| FEATURE | Li | Ca | Sr | Nd | La |
|---|---|---|---|---|---|
| ATOMIC NUMBER | 3 | 20 | 38 | 60 | 57 |
| RADIUS | 155 | 197 | 215 | 182 | 187 |
| VOLUME | 13.1 | 29.9 | 33.7 | 20.6 | 22.5 |
| MASS | 6.94 | 40.08 | 87.62 | 144.24 | 138.91 |
| BOILING POINT | 1118.15 | 1757 | 1657 | 3341 | 3730 |

```
# total energy = -282702.98699621105 eV
PRIMVEC
  13.2360698012    0.0000000000    0.0000000000
   0.0000000000   13.2360698012    0.0000000000
   0.0000000000    0.0000000000   12.7017164272
PRIMCOORD
192 1
Li   1.16742292981   11.1419581078   11.8087410073   -0.0273284000    0.0104727700    0.0224368600
Li   8.89817955551    1.1717521985    8.6049211926   -0.0103199600   -0.0367389000    0.0071343700
  :
La   1.4687974006     3.2403196008   11.3153903304    0.1279426700    0.0007294600   -0.0529905800
La   3.4618596427     1.6424427239    7.9701947305    0.0008264400    0.0282325800    0.0246388100
  :
```

601 — SELECT SAMPLES

602 — SET ERROR FUNCTIONS FOR RESPECTIVE SAMPLES

603 — SET ERROR FUNCTION FOR SELECTED SAMPLES

START

READ FEATURES OF ELEMENTS ~S101

READ LEARNING DATA ~S102

SET AND STORE WEIGHTS ~S103

READ MODEL PARAMETER ~S104

SET ERROR FUNCTION ~S105

CALCULATE OUTPUT VALUE OF ERROR FUNCTION ~S106

IS LEARNING ENDED? S107

NO

YES

UPDATE MODEL PARAMETER S108

END

| ELEMENT | Li | Ca | Sr | Nd | La |
|---|---|---|---|---|---|
| NUMBER OF ATOMS | 1225 | 565 | 512 | 58 | 565 |

$$l^{(n)} = \left( E_{NN}^{(n)}(x, \theta) - E_{DFT}^{(n)}(\sigma) \right)^2 + \lambda e_s^{(n)}$$

| ELEMENT | Li | Ca | Sr | Nd | La |
|---------|-----|-----|-----|-----|-----|
| WEIGHT | 20 | 3 | 1.5 | 1 | 1 |

DEVICE FOR MACHINE LEARNING MOLECULAR DYNAMICS USING ERROR FUNCTION

CROSS-REFERENCE TO RELATED APPLICATIONS

This application is based upon and claims the benefit of priority from Japanese Patent Application No. 2023-042587, filed on Mar. 17, 2023; the entire contents of which are incorporated herein by reference.

FIELD

Embodiments described herein relate generally to an information processing device, an information processing method, and a computer program product.

BACKGROUND

As a molecular dynamics method of simulating physical movement of atoms, a first-principle molecular dynamics method by density functional theory (DFT) or the like is known. Furthermore, as a method capable of reducing a calculation cost as compared with the first-principle molecular dynamics method, a machine learning molecular dynamics method using a model obtained by machine learning has been proposed.

In the machine learning molecular dynamics method, for example, a model that outputs forces acting on respective atoms and the entire energy on the basis of input atomic arrangement (positions of the respective atoms) is constructed, and the model is learned such that an error between an output value of the model and correct data is made small. As the error, for example, the root mean square for a prediction error of each atom is used.

BRIEF DESCRIPTION OF THE DRAWINGS

FIG. 3 is a diagram illustrating an example of learning data;

DETAILED DESCRIPTION

According to an embodiment, an information processing device includes one or more hardware processors configured to: set an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and learn the machine learning model using the error function.

Hereinafter, preferred embodiments of an information processing device according to the present invention will be described in detail with reference to the accompanying drawings.

In a conventional machine learning molecular dynamics method, a result that is physically invalid may be obtained in a case where forces acting on respective atoms are calculated using a learned model and a motion of an atom is simulated on the basis of the calculated forces. As one of the causes, it is conceivable that a feature (for example, mass) of an element is not considered during learning of a model. For example, in a case where errors of forces are the same, an error of acceleration is larger as the atom is lighter, which may affect accuracy of simulation. For this reason, a phenomenon may occur in which simulation succeeds in a case where accuracy of a learned model is low and a prediction error is large, and simulation fails in a case where a prediction error is small.

In the following embodiments, an error function using weights (load values) set by a feature (for example, mass) of elements is set as an error function used during learning a model. For example, in a case where a mass is used as a feature, the model is learned such that an error that is an output value of an error function set such that a lighter atom has a larger weight is made small. Simulation is likely to be successful using a model learned in this way.

The following embodiments can be applied to, for example, learning of a model used in a machine learning molecular dynamics method. The machine learning molecular dynamics method can be applied to, for example, processing of searching for a material of a battery (including a secondary battery), processing of searching for a material of a catalyst, and the like.

First Embodiment

Figures 1, 2:
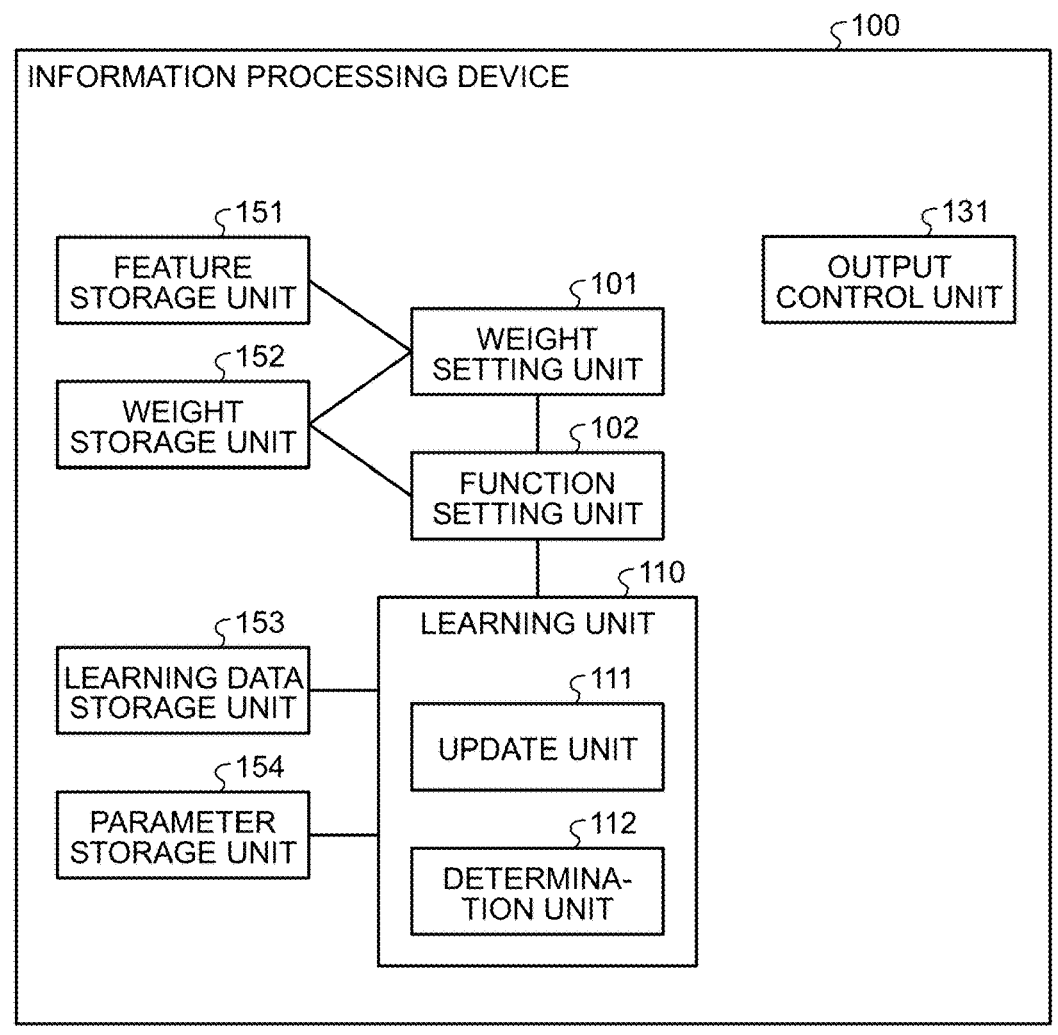
FIG. 1 is a block diagram of an information processing device according to a first embodiment.
FIG. 2 is a diagram illustrating an example of features for each element stored in a feature storage unit.

FIG. 1 is a block diagram illustrating an example of a configuration of an information processing device 100 according to a first embodiment. As illustrated in FIG. 1, the information processing device 100 includes a feature storage unit 151, a weight storage unit 152, a learning data storage unit 153, a parameter storage unit 154, a weight setting unit 101, a function setting unit 102, a learning unit 110, and an output control unit 131.

The feature storage unit 151 stores features for each element. FIG. 2 is a diagram illustrating an example of the features for each element stored in the feature storage unit 151. In FIG. 2, as the features, an atomic number, a radius, a volume, a mass, and a boiling point are described for every five elements (lithium {Li}, calcium {Ca}, strontium {Sr}, neodymium {Nd}, lanthanum {La}). The features of FIG. 2 are examples and are not limited thereto. For example, the features may be information correlated with a mass or atomic number.

Returning to FIG. 1, the weight storage unit 152 stores weights used for setting an error function. The weight storage unit 152 stores, for example, values of weights set by the weight setting unit 101 for the respective elements.

The learning data storage unit 153 stores learning data used for learning of a machine learning model (hereinafter, simply referred to as a model). The model is, for example, a model into which positions of a plurality of atoms included in an analysis target and information indicating which of a plurality of elements the plurality of atoms are, are input, and output a physical quantity of the analysis target. The information indicating which of the plurality of elements the plurality of atoms is, for example, is an element symbol.

The analysis target is, for example, a crystal and a molecule (including a polymer). The physical quantity is, for example, at least one of forces acting on respective atoms included in an analysis target or energy of the entire analysis target. The forces acting on respective atoms may be output independently of the energy, or values obtained by differentiating the energy at the positions of the atoms may be output.

The learning data includes input data input to such a model and correct data corresponding to correct answers of output of the model.

FIG. 3 is a diagram illustrating an example of the learning data. FIG. 3 illustrates an example of learning data represented in the xsf file format. In the example of FIG. 3, one xsf file stores one piece (one sample) of learning data for a crystal that is an analysis target.

The first row indicates energy of the unit cell of the crystal. In the example of FIG. 3, it is indicated that the energy is "−282702.98699621105 eV". The third to fifth rows indicate sizes in the x, y, and z directions of the unit cell. In the example of FIG. 2, it is indicated that the unit cell of this crystal is "13.2360698012 Å" in the x direction, "13.2360698012 Å" in the y direction, and "12.7017164272 Å" in the z direction. As a result, a cycle in which unit cells are arranged in each axial direction can be known for this crystal.

From the first column "192" of the row below "PRIMCO-ORD", it can be seen that the number of atoms included in the unit cell is 192. In the subsequent rows, information of 192 atoms is described. For example, information of an atom includes an element symbol, an x coordinate, a y coordinate, a z coordinate, an x component of the force, a y component of the force, and a z component of the force in this order. For example, element symbols and the xyz coordinates of the respective atoms correspond to input data, and the xyz components of forces and the energy in the first row correspond to correct data.

For example, in the first atom, the element is Li, the xyz coordinate is (1.1674292981, 11.1419581078, 11.8087410073), and the force acting on this atom is (−0.0273284000, 0.0104727700, 0.0224368600).

FIG. 3 illustrates an example in which the analysis target is a crystal, but the analysis target may be a molecule (polymer) as described above. In a case where the analysis target is a molecule, energy of the entire molecule, coordinates of each of the atoms included in the molecule, and forces acting on the respective atoms are stored as learning data similarly to the case of a crystal.

The learning data storage unit 153 stores a plurality of samples assuming the learning data (xsf file) as illustrated in FIG. 3 as one sample. Although a plurality of atoms is included in one sample, hereinafter, a set of coordinates of all atoms in one sample is referred to as atomic arrangement.

Returning to FIG. 1, the parameter storage unit 154 stores a parameter of the model (model parameter). The model may be a model of any structure, and for example, the following model can be used.

Behler-Parrinello type neural network model

Graph neural network model

Gaussian process regression model

In a case where the model is a neural network model, the parameter storage unit 154 stores, for example, a weight, a bias, or the like as a model parameter.

Figure 4:
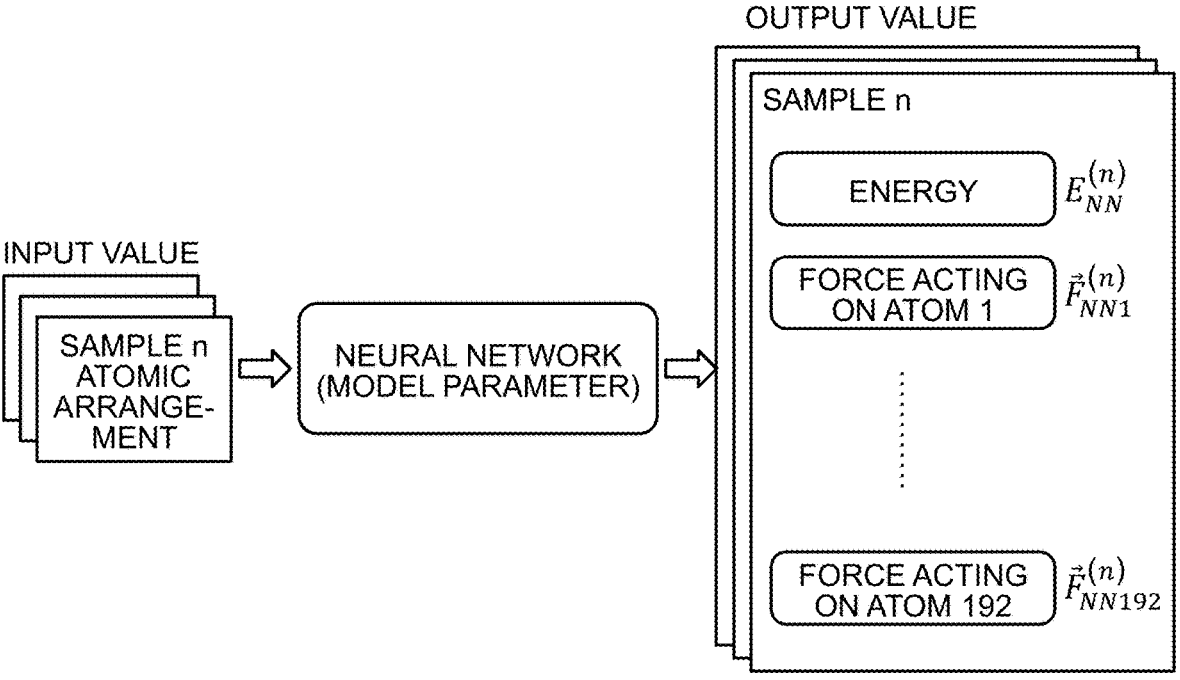
FIG. 4 is a diagram illustrating an example of a relationship between input and output of a model.

FIG. 4 is a diagram illustrating an example of a relationship between input and output of the model in a case where a neural network model is used. As illustrated in FIG. 4, the model inputs the atomic arrangement as an input value, and outputs energy and forces acting on the respective atoms as an output value. The neural network is defined by the model parameter. In a case where the values of the model parameter are updated, the output values change even using the same input value.

Note that each storage unit (feature storage unit 151, weight storage unit 152, learning data storage unit 153, parameter storage unit 154) can be configured by any commonly used storage medium such as a flash memory, a memory card, a random access memory (RAM), a hard disk drive (HDD), or an optical disc.

Each storage unit may be a physically different storage medium or may be implemented as different storage areas of a physically same storage medium. Furthermore, each storage unit may be implemented by a plurality of physically different storage media.

Returning to FIG. 1, the weight setting unit 101 sets weights used for setting an error function. In the present embodiment, the weight setting unit 101 sets a plurality of weights such that different values are set according to the feature of each element. For example, the weight setting unit 101 sets reciprocals of values of the feature as the weights. In a case where a mass or an atomic number is used as the feature, using reciprocals of values of the feature as weights corresponds to making the weights larger as the atoms are lighter.

In the example of FIG. 2, the weight setting unit 101 calculates the weight of Li as 1/6.94=0.144 and the weight of La as 1/138.91=0.00720. In this example, the weight of Li is about 20 times the weight of La.

The function setting unit 102 sets an error function used during learning of the model. Setting an error function means defining an error function used for learning by the learning unit 110 to be described below. Note that processing of calculating an error that is an output value of the error function using the set error function is executed by the learning unit 110.

For example, the function setting unit 102 sets an error function such that a plurality of terms obtained by multiplying an error of the physical quantity for each of a plurality of elements by a plurality of weights of the respective elements set by the weight setting unit 101. The function setting unit 102 sets an error function using selected N (N is an integer of 2 or more) samples of learning data. For example, the function setting unit 102 may select all or a part of the learning data stored in the learning data storage unit 153. The following Formula (1) indicates an example of the error function set by the function setting unit 102.

$$I^{(n)} = \left( E_{NN}^{(n)}(x, \theta) - E_{DFT}^{(n)}(\sigma) \right)^2 + \lambda \left[ w_1 e_1^{(n)} + w_2 e_2^{(n)} + \dots + w_K e_K^{(n)} \right] \quad (1)$$

$E_{NN}^{(n)}(x, \theta)$: Energy of sample $n$ calculated by model $E_{DFT}^{(n)}(\sigma)$: Energy of sample $n$ stored in learning data "(n)" in Formula (1) represents a value corresponding to the n-th (n is an integer satisfying $1 \leq n \leq N$) sample (hereinafter, also referred to as a sample n) among the N samples of the learning data. $e_k^{(n)}$ is an error with respect to an element k (hereinafter, referred to as element-specific error), and is expressed by the following Formula (2).

$$e_k^{(n)} = \sum_{i \in \sigma_k} \left\| \vec{F}_{NNi}^{(n)}(x, \theta) - \vec{F}_{DFTi}^{(n)} \right\|^2 \quad (2)$$

$\vec{F}_{NNi}^{(n)}(x, \theta)$: Force acting on $i-th$ atom included in sample $n$ calculated by model $\vec{F}_{DFTi}^{(n)}$: Force acting on $i-th$ atom included in sample $n$ stored in learning data $\sigma_k$ in Formula (2) is a set of identification information for identifying one or more atoms of the element k. The identification information for identifying an atom is, for example, a numerical value of a serial number starting from 1. In the example of the learning data of FIG. 3, for example, numerical values of serial numbers from 1 to 192 in order from the upper row are associated with 192 atoms as the identification information.

k is identification information for identifying a plurality of elements. The identification information of an element is, for example, a numerical value of a serial number starting from 1, but is not limited to a numerical value, and may be a symbol (for example, element symbol) or the like. Hereinafter, k is assumed to be an integer satisfying $1 \leq k \leq K$. K is the number of types of the elements included in the analysis target.

$\lambda$ in Formula (1) is a constant. For example, $\lambda$ is designated by a user. x represents input data to the model. $\theta$ represents a model parameter. Note that "DFT" indicates that energy of the learning data (corresponding to the correct data) is obtained by density functional theory (DFT), but the correct data may be obtained by any method other than DFT. $w_k$ is the weight of the element k. The weight wx is calculated by, for example, the following Formula (3). In the Formula (3), mx is the mass of atoms of the element k. Note that Formula (3) is a formula indicating that the weight $w_k$ in Formula (1) is calculated by the reciprocal of the mass.

$$w_k = \frac{1}{m_k} \quad (3)$$

Formula (2) corresponds to a formula for calculating an element-specific error $e_k^{(n)}$ (second error) corresponding to a sum of errors (first errors) of forces (example of physical quantities) of a plurality of respective atoms for each element. Furthermore, Formula (1) corresponds to an error function including a plurality of (K) terms obtained by multiplying the element-specific error $e_k^{(n)}$ by the weight $w_k$ for each element.

The function setting unit 102 may set an error function for all the samples from error functions for the respective samples. For example, the function setting unit 102 sets an error function L for all the samples by taking a sum of the error functions for the respective samples. The error function L is expressed by, for example, the following Formula (4).

$$L = \sum_{m \in \Omega} I^{(m)} \quad (4)$$

$\Omega$ is set of samples that are targets of error function setting

The learning unit 110 learns the model using a set error function. For example, the learning unit 110 repeatedly executes learning of the model using a plurality of pieces of the learning data a plurality of times until the learning is determined to be ended. The learning unit 110 includes an update unit 111 and a determination unit 112.

The update unit 111 calculates an output value of an error function using the learning data, and updates (corrects) the model parameter on the basis of the calculation result. For example, the update unit 111 updates the model parameter such that the output value of the error function is made small. A method of updating the model parameter may be any method, and for example, a method such as a steepest descent method, Adam, or a Kalman filter can be used. The update unit 111 stores the updated model parameter in the parameter storage unit 154.

The determination unit 112 determines whether to end learning. For example, the determination unit 112 checks the output value of the error function calculated by the update unit 111, and determines to end the learning in a case where change in the output value of the error function is smaller than a threshold. The method of determining the end of learning is not limited to this, and any method may be used. For example, the determination unit 112 may determine to end the learning in a case where the number of times of update of the model parameter is larger than the number of times of learning designated in advance.

The output control unit 131 controls output of various types of information used in the information processing device 100. For example, the output control unit 131 outputs the model parameter of the learned model to an external device that performs processing using the model (for example, analysis of an analysis target by the machine learning molecular dynamics method).

At least some of each unit (weight setting unit 101, function setting unit 102, learning unit 110, and output control unit 131) may be implemented by one processing unit. Each unit is implemented by, for example, one or a plurality of processors. For example, each unit may be implemented by a processor such as a central processing unit (CPU) or a graphics processing unit (GPU) being caused to execute a program, that is, by software. Each unit may be implemented by a processor such as a dedicated integrated circuit (IC), that is, by hardware. Each unit may be implemented using software and hardware in combination. In a case where a plurality of processors is used, each of the processors may implement one of the units or two or more of the units.

Details of the processing by the function setting unit 102 will be further described.

Figure 5:
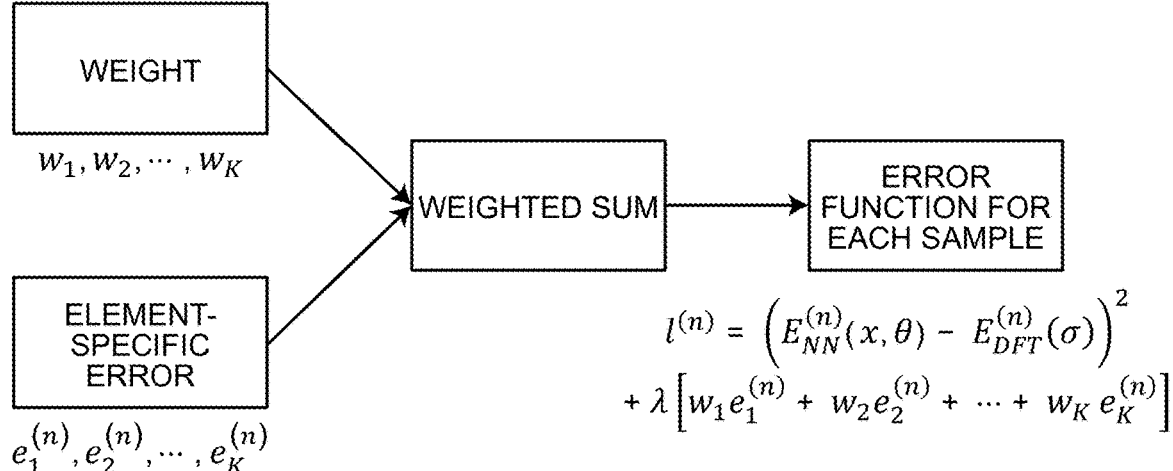
FIG. 5 is a diagram illustrating a state of obtaining an error function for each sample.

FIG. 5 is a diagram illustrating a state of obtaining an error function $l^{(n)}$ for each sample indicated in Formula (1) using the weights for respective elements and element-specific errors. The weight $w_k$ is set by the weight setting unit 101. The element-specific error $e_k^{(n)}$ is obtained by, for example, Formula (2). The function setting unit 102 sets the error function $l^{(n)}$ for each sample such that a weighted sum of the weight $w_k$ and the element-specific error $e_k^{(n)}$ are included. In Formula (1), the error function $l^{(n)}$ for each sample includes an error of the energy and an error of the force, but does not necessarily include an error of the energy of the first term.

Figure 6:
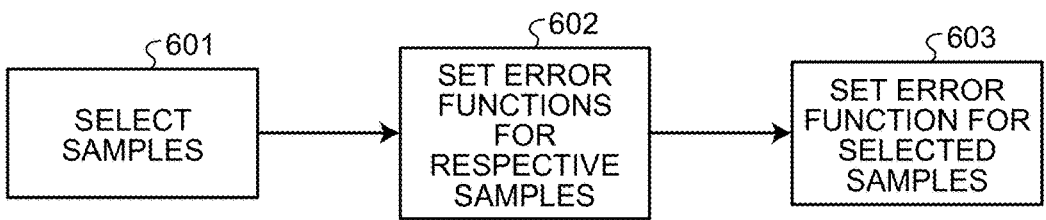
FIG. 6 is a diagram illustrating a function of obtaining an error function for all samples.

FIG. 6 is a diagram illustrating a function of obtaining the error function L for all the samples using error functions for the respective samples.

In processing 601, the function setting unit 102 selects N samples used for setting an error function. As described above, the function setting unit 102 may select all the samples stored in the learning data storage unit 153 or may select some of all the samples.

In processing 602, the function setting unit 102 sets the error functions for the respective samples using the selected N samples n. This processing corresponds to, for example, the processing illustrated in FIG. 5.

In processing 603, the function setting unit 102 sets the error function L for selected samples by taking a sum of the error functions for the respective samples according to Formula (4), for example.

In a case where learning is repeated a plurality of times, the processing 601 to 603 illustrated in FIG. 6 is repeatedly executed. In a case where there is no change in the N samples selected in the processing 601, the set error function is not changed. As described above, even in a case where the model parameter is updated during repeated learning, the definition of the error function does not necessarily need to be changed. In such a case, the function setting unit 102 may be configured to set the error function only at the first repetition.

Next, details of the processing by the update unit 111 will be further described.

The update unit 111 calculates output values using error functions for respective samples for M (M is an integer of 1 or more) samples m ($1 \leq m \leq M$) designated as samples used for learning. The M samples may be designated in any way, for example, as follows.

All pieces of the learning data stored in the learning data storage unit 153 is designated as samples.

Different M samples are designated for each repetition of learning. For example, the designated number of samples are designated from the head in the arrangement order of the samples. Alternatively, samples are randomly designated for each repetition of learning. In this case, a subset including M samples different for each repetition of learning may be designated among the set of all the learning data.

For example, for each of M samples m, the update unit 111 calculates an error that is a difference between energy and a force acting on an atom output from the model as a prediction value and energy and a force acting on the atom stored in the samples as the correct data. The update unit 111 inputs calculated errors to, for example, Formula (1), and calculates an output value of an error function for each of the samples m.

The update unit 111 also calculates an output value of the error function L that is a sum of output values of error functions for the M samples according to Formula (4). Further, the update unit 111 updates the model parameter such that the value of L is made small according to an algorithm such as the steepest descent method, Adam, or the Kalman filter.

Figure 7:
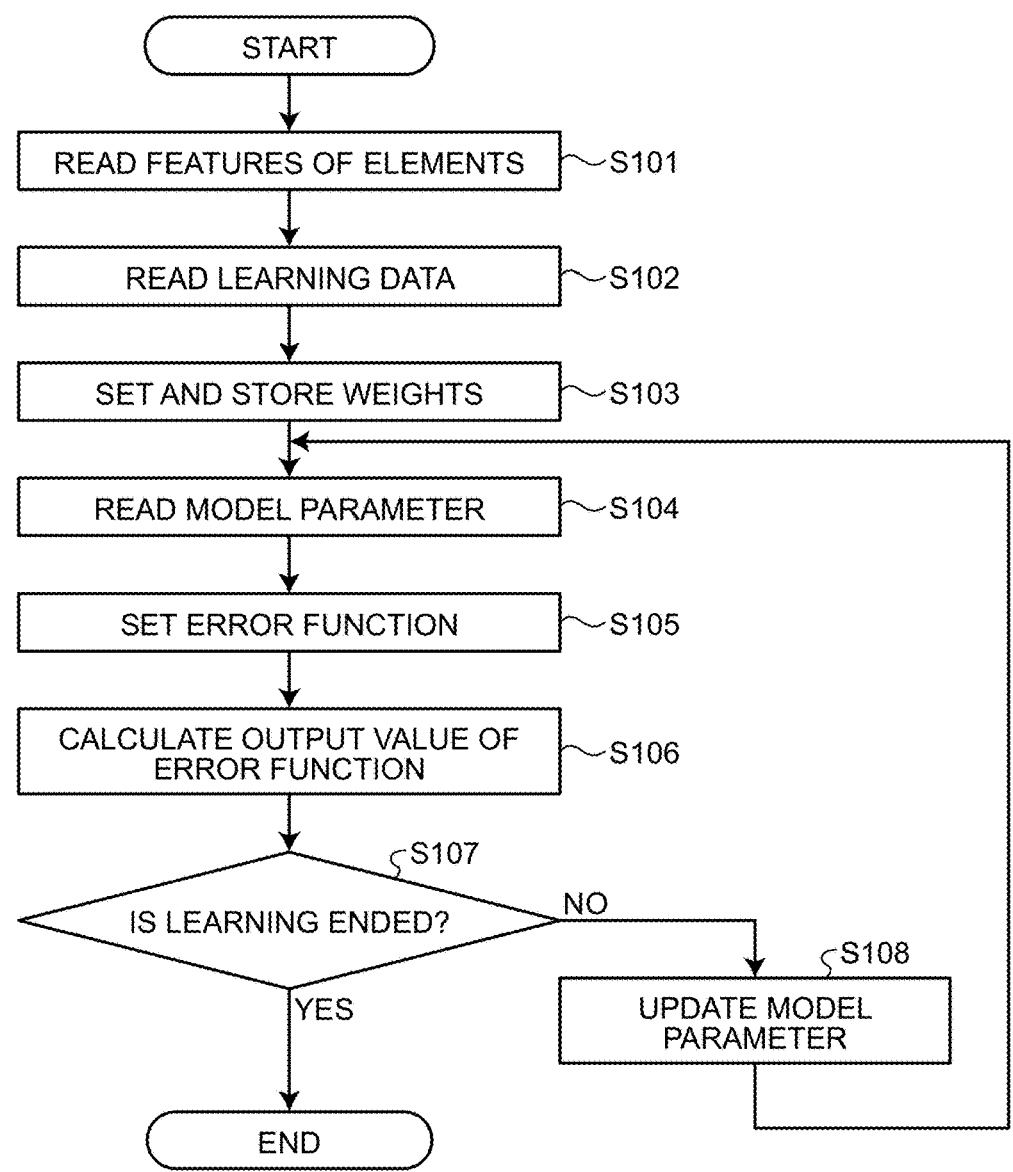
FIG. 7 is a flowchart of learning processing according to the first embodiment.

Next, model learning processing by the information processing device 100 according to the first embodiment will be described. FIG. 7 is a flowchart illustrating an example of learning processing according to the first embodiment.

The weight setting unit 101 reads a feature of the elements from the feature storage unit 151 (step S101). For example, the weight setting unit 101 reads a mass among the features of the elements illustrated in FIG. 2. The weight setting unit 101 reads N samples of the learning data from the learning data storage unit 153 (step S102). The weight setting unit 101 sets, for example, reciprocals of the mass as weights and stores the weights in the weight storage unit 152 (step S103).

The learning unit 110 (update unit 111) reads the model parameter stored in the parameter storage unit 154 (step S104).

The function setting unit 102 sets error functions using the weights set by the weight setting unit 101 (step S105).

The update unit 111 calculates an output value of the error function L using the learning data read in step S102, the model parameter read in step S104, and the error functions set in step S105 (step S106).

The determination unit 112 determines whether to end the learning (step S107). For example, in a case where the difference between the output value calculated last time and the output value calculated this time is less than a threshold, or in a case where the number of times of update of the model parameter exceeds a designated number of times of learning, the determination unit 112 determines to end the learning.

In a case where the learning is determined not to be ended (step S107: No), the update unit 111 updates the model parameter such that the output value of the error function calculated in step S106 is made small, and stores the updated value in the parameter storage unit 154 (step S108). The update unit 111 also increases the number of times of update of the model parameter by 1. Note that it is assumed that the number of times of update of the model parameter is initially initialized to 0.

In a case where the learning is determined to be ended (step S107: Yes), the learning processing ends.

As described above, in the first embodiment, the model is learned using the error function using the weights set by a feature of the elements. As a result, learning accuracy of the model used for analysis of a motion of an atom and the like can be further improved.

Second Embodiment

An information processing device according to the second embodiment aggregates the number of atoms for each of a plurality of elements, and sets a weight using the number of atoms or a ratio of the number of atoms to the total number of atoms.

Figures 8, 9:
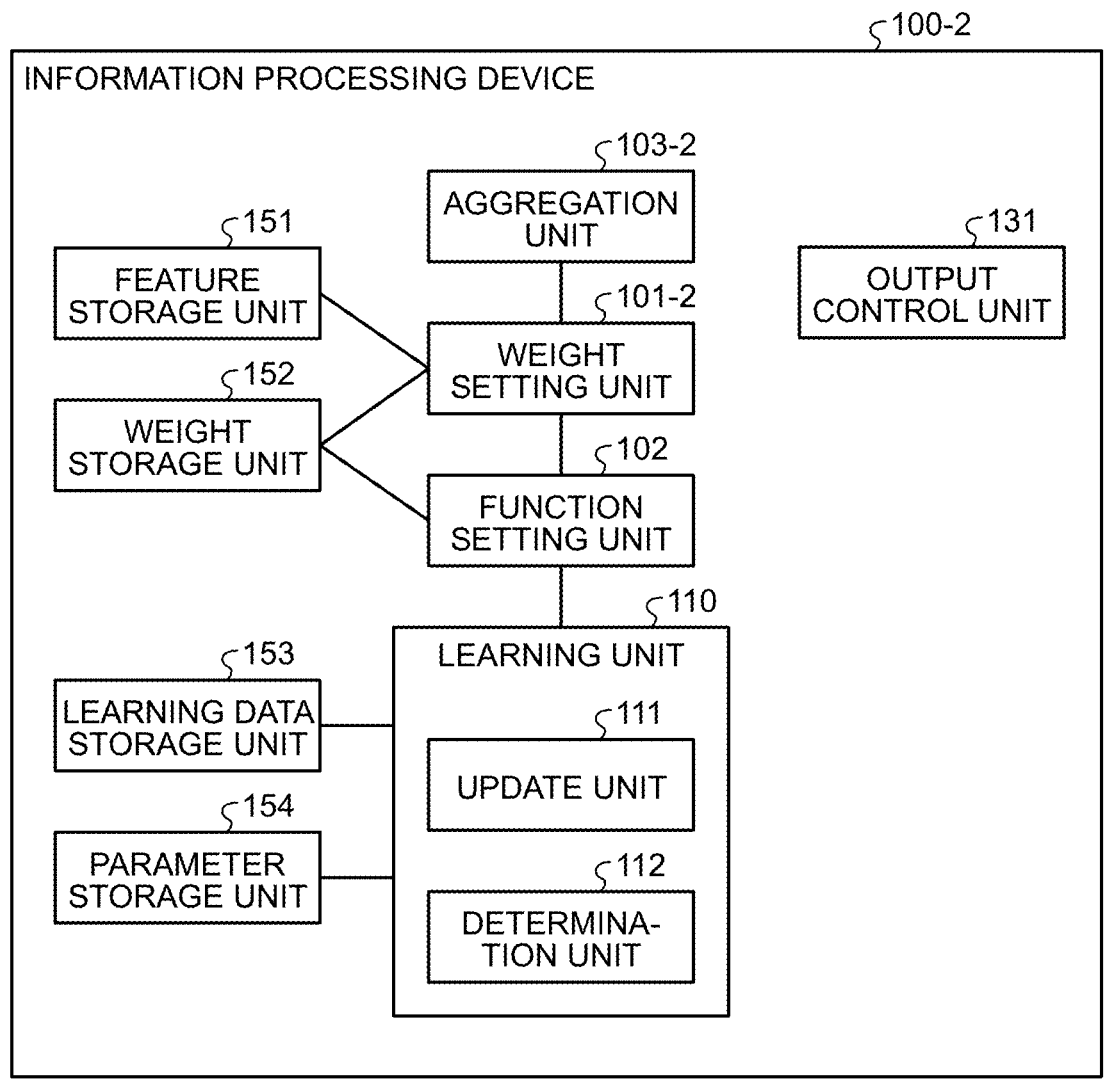
FIG. 8 is a block diagram of an information processing device according to a second embodiment.
FIG. 9 is a diagram illustrating an example of the obtained number of atoms for each element.

FIG. 8 is a block diagram illustrating an example of a configuration of an information processing device 100-2 according to the second embodiment. As illustrated in FIG. 8, the information processing device 100-2 includes a feature storage unit 151, a weight storage unit 152, a learning data storage unit 153, a parameter storage unit 154, a weight setting unit 101-2, a function setting unit 102, an aggregation unit 103-2, a learning unit 110, and an output control unit 131.

The second embodiment is different from the first embodiment in the aggregation unit 103-2 being added and a function of the weight setting unit 101-2. Other configurations and functions are similar to those in FIG. 1 that is a block diagram of the information processing device 100 according to the first embodiment, and thus, are denoted by the same reference signs, and description thereof is omitted here.

The aggregation unit 103-2 aggregates the number of atoms that is the number of atoms of an element included in a plurality of pieces of learning data for each of a plurality of elements on the basis of a plurality of pieces of learning data. For example, the aggregation unit 103-2 selects one or more samples among samples read as learning data, counts the number of atoms included in the selected samples for each element, and obtains the number of atoms for each element. FIG. 9 is a diagram illustrating an example of the obtained number of atoms for each element.

Returning to FIG. 8, the weight setting unit 101-2 sets a weight for each element on the basis of the obtained number of atoms or a ratio of the number of atoms to the total number of atoms of all elements included in the plurality of pieces of learning data. For example, the weight setting unit 101-2 obtains the weight $w_k$ of an element k by $w_k=1/(m_k*\text{number of atoms})$ using the mass $m_k$ of an element read from the feature storage unit 151 and the number of atoms of the element obtained by the aggregation unit 103-2. The ratio may be used instead of the number of atoms. The weight setting unit 101-2 may obtain the weight $w_k$ by $w_k=1/\text{number of atoms}$. This can be interpreted as an example in which the number of atoms for each of the elements included in an analysis target is a feature of the elements. Note that, in these calculation methods, an element having a larger number of atoms has a smaller weight. The method of calculating a weight using the number of atoms or the ratio is not limited thereto. For example, a method in which a weight is larger as the number of atoms of an element is larger may be used.

Figure 10:
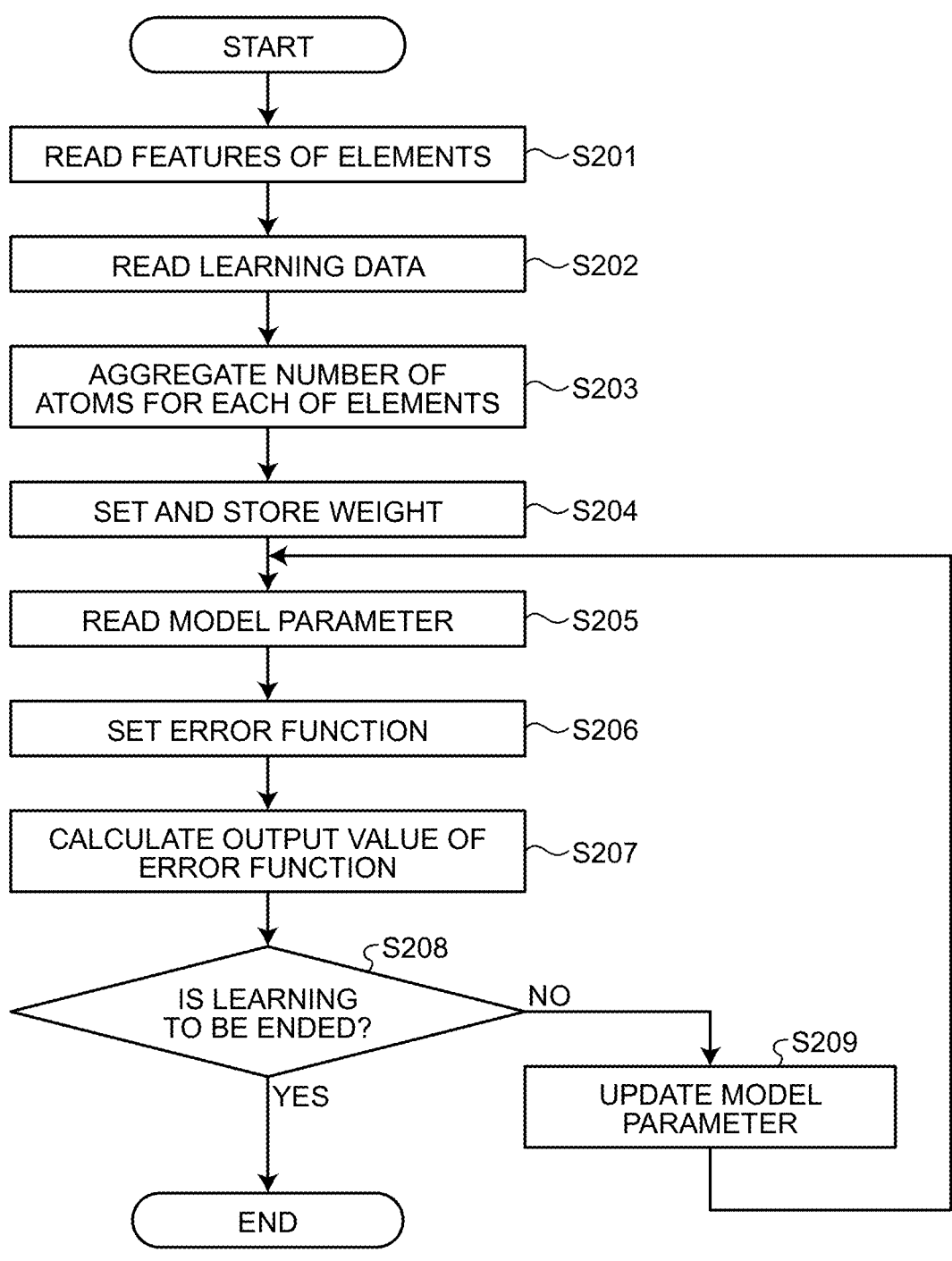
FIG. 10 is a flowchart of learning processing according to the second embodiment.

Next, learning processing by the information processing device 100-2 according to the second embodiment will be described with reference to FIG. 10. FIG. 10 is a flowchart illustrating an example of learning processing according to the second embodiment.

Since steps S201 and S202 are similar to steps S101 and S102 in the information processing device 100 of the first embodiment, the description thereof will be omitted.

The aggregation unit 103-2 aggregates the number of atoms for each of the elements included in the learning data using all or a part of the read learning data (step S203). The weight setting unit 101-2 obtains the weight $w_k=1/(m_k*\text{number of atoms})$ of the element k using the feature (for example, mass $m_k$) of the element and the number of atoms for each of the elements, and stores the weight in the weight storage unit 152 (step S204).

Since steps S205 to S209 are similar to steps S104 to S108 in the information processing device 100 of the first embodiment, the description thereof will be omitted.

As described above, the information processing device according to the second embodiment learns the model using an error function using weights each in which the number of atoms (or ratio of the number of atoms) is further considered for each of the elements included in the learning data. As a result, learning accuracy of the model can be further improved.

Next, modifications applicable to the above embodiments and the following embodiments will be described. Hereinafter, a case where the first embodiment is the application target will be described as an example, but other embodiments can also be an application target similarly.

Figure 11:
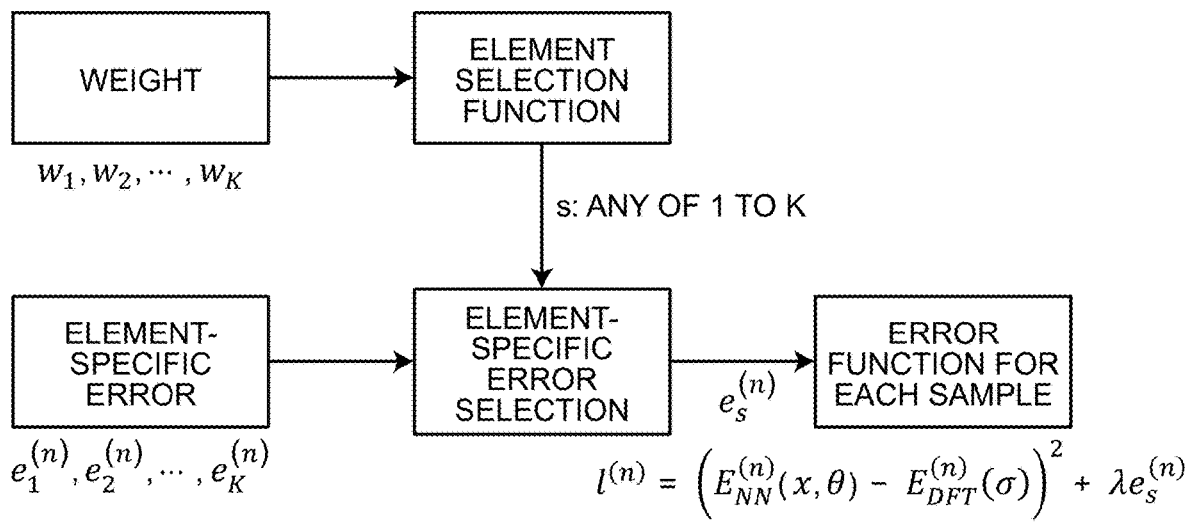
FIG. 11 is a diagram illustrating a state of obtaining an error function for each sample in a first modification.

In the above embodiments, an error function is set such that terms obtained by multiplying a weight for each of the elements by an error of a physical quantity is included. In the modifications, the function setting unit 102 selects one or more elements from among a plurality of elements with a probability corresponding to the magnitude of weights, and sets an error function including errors of physical quantities for the selected elements. Hereinafter, two modifications including different selection methods will be described.
First Modification FIG. 11 is a diagram illustrating a state of obtaining the error function $I^{(n)}$ for each sample in a first modification. The function setting unit 102 of the first modification selects an element for each sample of a plurality of pieces of learning data according to a probability corresponding to the magnitude of the weights for respective elements. For example, the function setting unit 102 selects an element k according to a probability $p_k$ expressed by the following Formula (5). The selected element is denoted as element s below. s is any of 1 to K.

$$p_k = \frac{w_k}{w_1 + w_2 + \ldots + w_K} \tag{5}$$

In a case where the element s is selected, the function setting unit 102 sets an error function for each sample using only an error of a force with respect to the element s (element-specific error $e_k^{(s)}$). For example, the function setting unit 102 sets an error function including an error of the force with respect to the selected element s (element-specific error $e_k^{(s)}$) and not including an error of an unselected element.

The following Formulas (6) and (7) illustrate examples of the error function set in the present modification. Formula (6) is an example of an error function in a case where one element s is selected. Formula (7) is an example of an error function in a case where two elements s and s' are selected. The number of selected elements is not limited to one or two, and may be three or more.

$$I^{(n)} = \left(E_{NN}^{(n)}(x, \theta) - E_{DFT}^{(n)}(\sigma)\right)^2 + \lambda e_s^{(n)} \tag{6}$$

$$I^{(n)} = \left(E_{NN}^{(n)}(x, \theta) - E_{DFT}^{(n)}(\sigma)\right)^2 + \lambda\left(e_s^{(n)} + e_{s'}^{(n)}\right) \tag{7}$$

Figure 12:
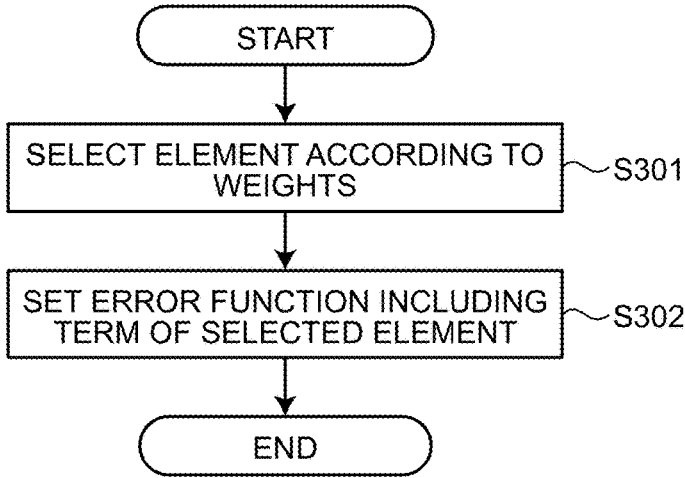
FIG. 12 is a flowchart of error function setting processing according to the first modification.

FIG. 12 is a flowchart illustrating an example of error function setting processing according to the first modification. The setting processing of FIG. 12 corresponds to, for example, processing that embodies step S105 of the learning processing of FIG. 7. Note that the flow of the entire learning processing is similar to that in FIG. 7.

In the first modification, the function setting unit 102 selects the element s according to weights set by the weight setting unit 101 (step S301). The function setting unit 102 sets an error function including a term of the selected element s as in, for example, Formula (6) or Formula (7) (step S302).

According to the first modification, an error function including a term of only some elements selected according to the weights can be used as indicated in Formulas (6) and (7). As a result, the error function is made a simpler formula, and the load of calculation can be reduced. In a case where a large number of samples of learning data are used, a large number of different elements may be selected according to the weights. Therefore, for example, selected elements are not biased, and a learning result similar to that of the embodiments can be obtained.

Second Modification

Figure 13:
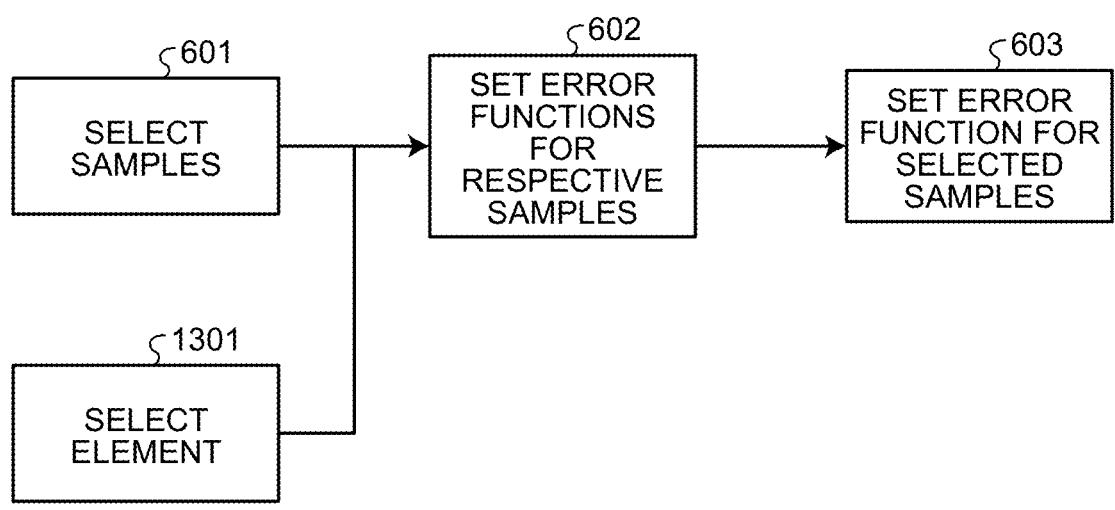
FIG. 13 is a diagram for describing a function of obtaining an error function in a second modification.

In a second modification, an element common to samples of all pieces of learning data is selected in each of a plurality of times of learning repeatedly executed. FIG. 13 is a diagram for describing a function of obtaining the error function L in the second modification. As compared with FIG. 6 of the first embodiment, processing 1301 of selecting an element is added in the second modification.

Figure 14:
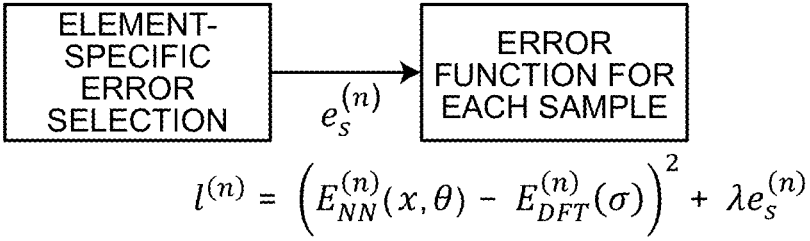
FIG. 14 is a diagram illustrating a state of obtaining an error function for each sample in the second modification.

In the processing 1301, the function setting unit 102 of the second modification selects an element according to a probability indicated in Formula (5), similarly to the first modification. As illustrated in FIG. 14, the function setting unit 102 also obtains an error function for each sample using the selected element s. FIG. 14 corresponds to the processing 602 in FIG. 13. The formula of an error function in the second modification is the same as that in the first modification, and for example, Formula (6) or Formula (7) can be used.

In the first modification, a different element is selected for each sample, whereas in the second modification, the same element is selected for all samples. That is, the function setting unit 102 of the second modification selects one or more elements with a probability corresponding to the magnitude of a plurality of weights for each of a plurality of times of learning.

Figure 15:
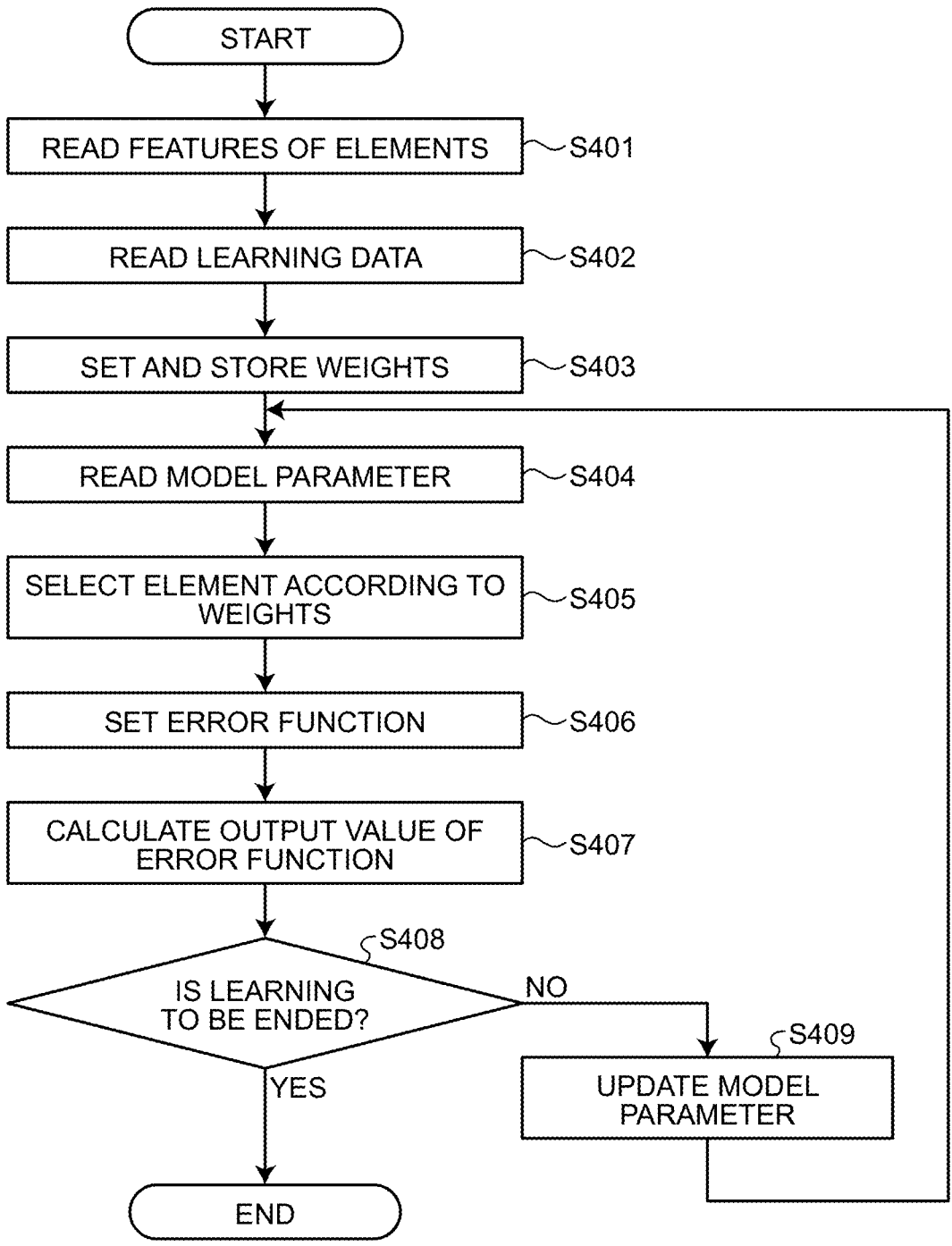
FIG. 15 is a flowchart of learning processing in the second modification.

FIG. 15 is a flowchart illustrating an example of learning processing in the second modification. Since steps S401 to S404 are similar to steps S101 to S104 in the information processing device 100 of the first embodiment, the description thereof will be omitted.

In the second modification, the function setting unit 102 selects the element s with a probability according to the weights of respective elements (step S405). The function setting unit 102 sets an error function for each sample using only an error of a force with respect to the selected element s (element-specific error $e_k^{(s)}$) (step S406).

Since steps S407 to S409 are similar to steps S106 to S108 in the information processing device 100 of the first embodiment, the description thereof will be omitted.

In the second modification, an error function including a term of only some elements selected according to the weights can be used similarly to the first modification. As a result, the error function is made a simpler formula, and the load of calculation can be reduced. In the second modification, the same element is selected for all the samples included in learning data used in one repetition of learning, but in a case where learning is repeated a plurality of times, a large number of different elements can be selected according to the weights. Therefore, for example, selected elements are not biased, and a learning result similar to that of the embodiments can be obtained.

Third Embodiment

Figure 16:
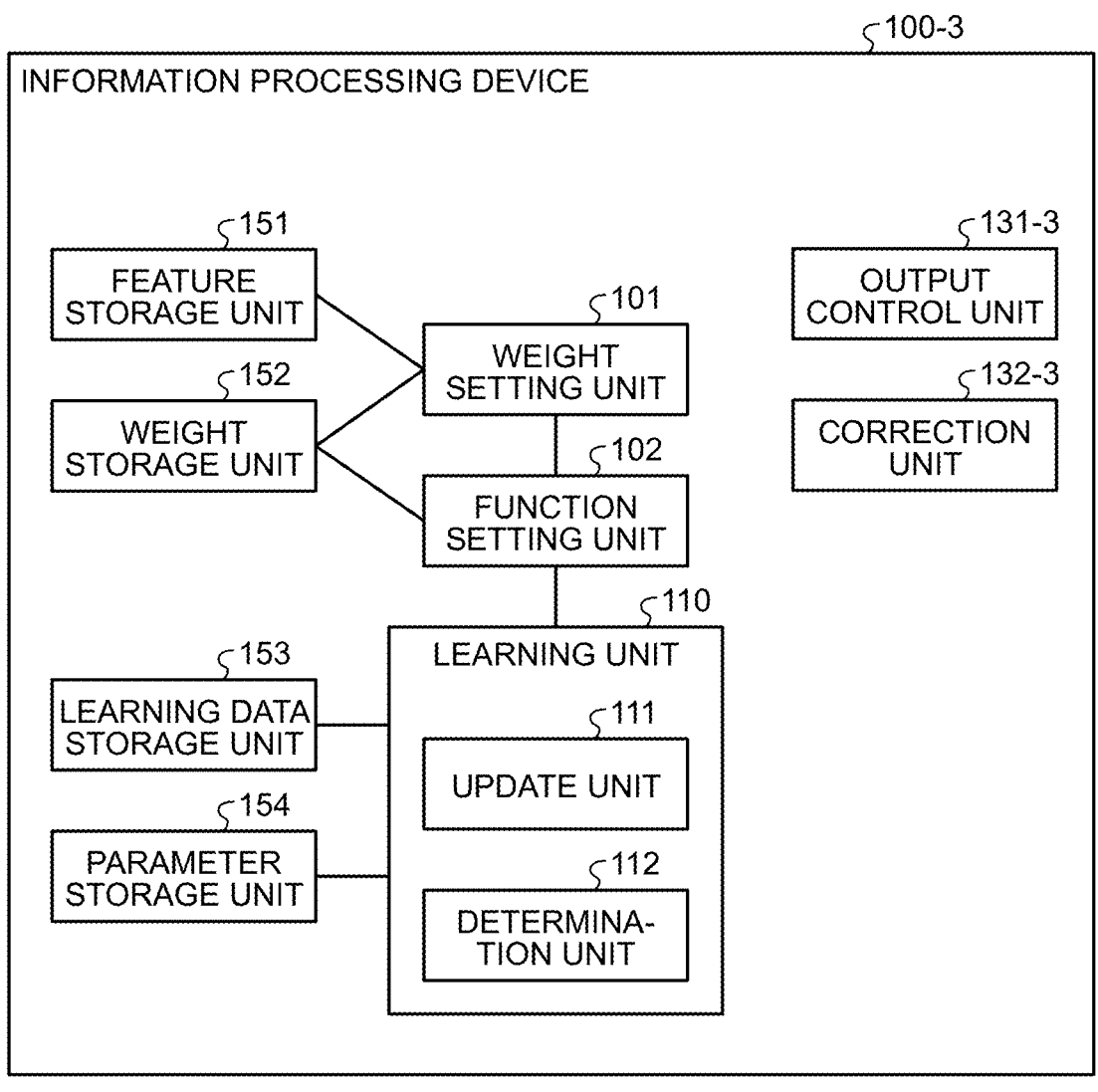
FIG. 16 is a block diagram of an information processing device according to a third embodiment.

An information processing device according to a third embodiment includes a function of correcting a weight value. FIG. 16 is a block diagram illustrating an example of a configuration of an information processing device 100-3 according to the third embodiment. As illustrated in FIG. 16, the information processing device 100-3 includes a feature storage unit 151, a weight storage unit 152, a learning data storage unit 153, a parameter storage unit 154, a weight setting unit 101, a function setting unit 102, a learning unit 110, an output control unit 131-3, and a correction unit 132-3.

The third embodiment is different from the first embodiment in a function of the output control unit 131-3 and the correction unit 132-3 being added. Other configurations and functions are similar to those in FIG. 1 that is a block diagram of the information processing device 100 according to the first embodiment, and thus, are denoted by the same reference signs, and description thereof is omitted here.

The output control unit 131-3 is different from the output control unit 131 of the first embodiment in a function of outputting output information including an output value of an error function being further included. For example, the output control unit 131-3 controls a display device such as a display connected to the information processing device 100-3 such that the output information is displayed.

The correction unit 132-3 executes correction processing of correcting at least some of a plurality of weights to a designated value. For example, the correction unit 132-3 corrects a weight for which correction is designated among the plurality of weights to a value designated by a user according to the output information displayed on the display device.

Note that the function setting unit 102 sets an error function including one or more terms based on the plurality of weights after the correction processing is executed.

In the example of the learning processing illustrated in FIG. 7, the correction processing is executed, for example, after an output value of an error function is calculated in step S106. For example, the output control unit 131-3 displays the output value after step S106. The correction unit 132-3 corrects a weight to a value designated according to the displayed output value. After the correction, for example, the processing returns to step S105, and the function setting unit 102 sets an error function using the weights after correction.

As described above, a value of a weight can be corrected by a user or the like in the third embodiment. As a result, for example, a more appropriate weight value can be searched for.

Fourth Embodiment

An information processing device according to a fourth embodiment sets weights used for setting an error function on the basis of weights designated by a user or the like.

Figure 17:
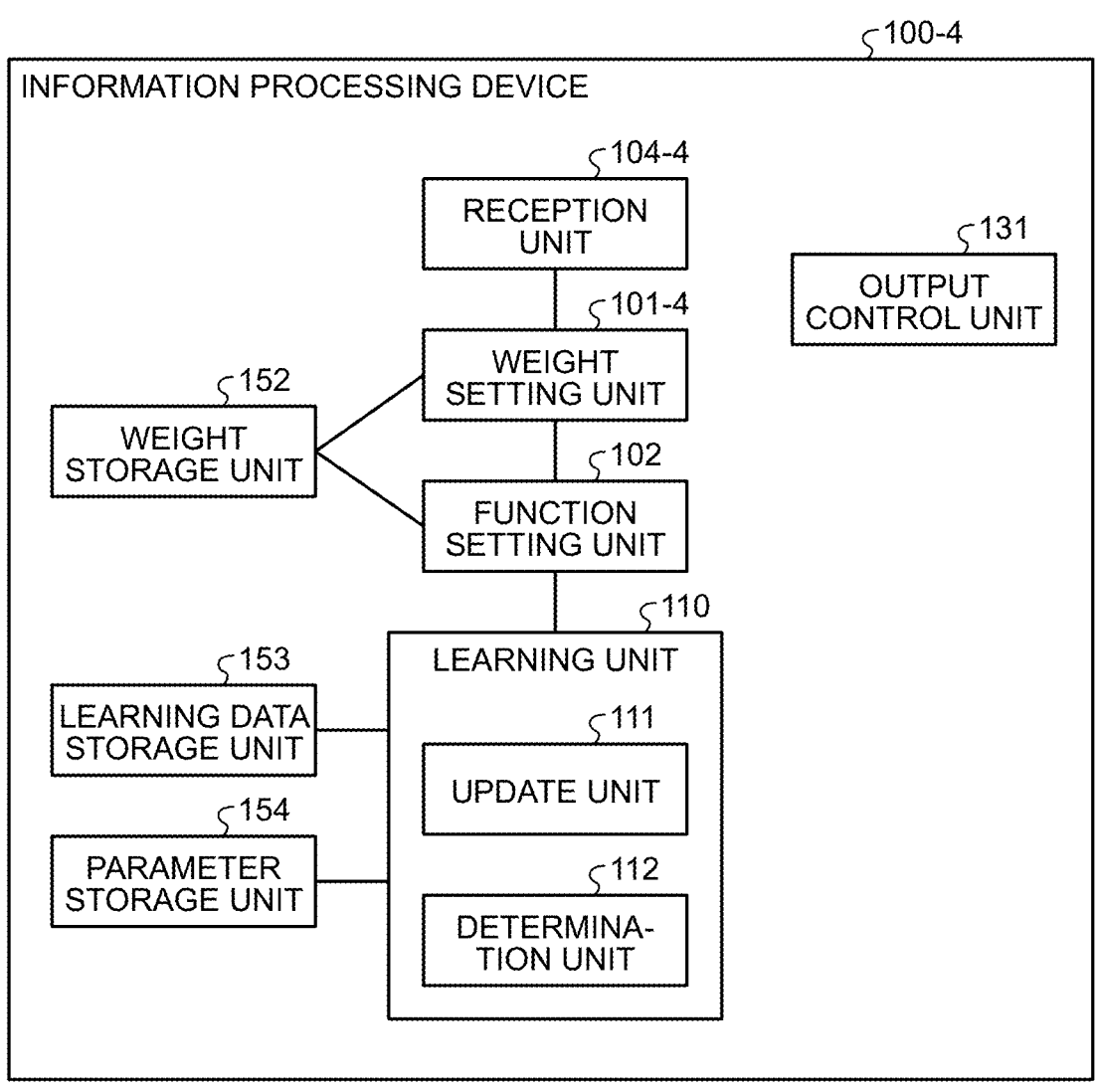
FIG. 17 is a block diagram of an information processing device according to a fourth embodiment.

FIG. 17 is a block diagram illustrating an example of a configuration of an information processing device 100-4 according to the fourth embodiment. As illustrated in FIG. 17, the information processing device 100-4 includes a weight storage unit 152, a learning data storage unit 153, a parameter storage unit 154, a weight setting unit 101-4, a function setting unit 102, a reception unit 104-4, a learning unit 110, and an output control unit 131.

The fourth embodiment is different from the first embodiment in the feature storage unit 151 being deleted, the reception unit 104-4 being added, and a function of the weight setting unit 101-4. Other configurations and functions are similar to those in FIG. 1 that is a block diagram of the information processing device 100 according to the first embodiment, and thus, are denoted by the same reference signs, and description thereof is omitted here.

The reception unit 104-4 receives a plurality of weights designated for a plurality of respective elements. For example, the reception unit 104-4 receives inputs of a plurality of weights for a plurality of respective elements designated by a user or the like.

Figures 18, 19:
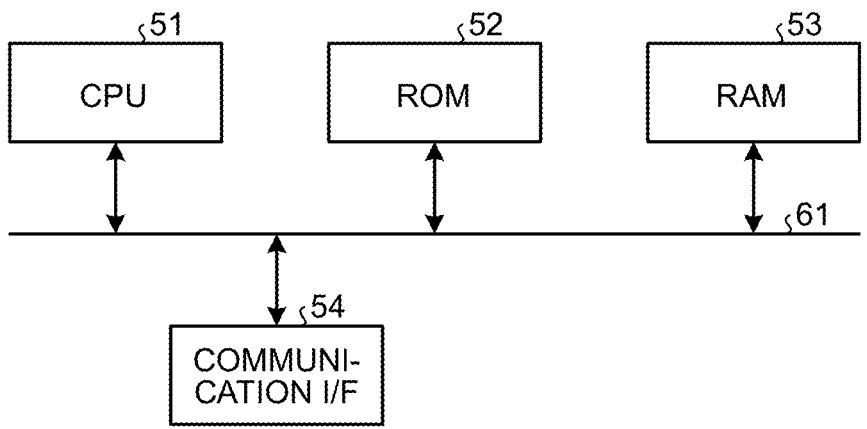
FIG. 18 is a diagram illustrating an example of weights for respective designated elements.
FIG. 19 is a hardware configuration diagram of the information processing device according to the first to fourth embodiments.

The weight setting unit 101-4 sets the received weights as weights used in setting of an error function by the function setting unit 102. For example, in a case where values of weights are designated by a user or the like such that different values are set according to the features of respective elements, a function similar to that of the above embodiments can be implemented using an error function using the designated weights. For example, the designated weights may be any values as long as the correlation with the reciprocals of the mass of the elements is a threshold (for example, 90%) or more. FIG. 18 is a diagram illustrating an example of the weights for the respective designated elements.

The weight setting unit 101-4 of the present embodiment does not need to calculate and set weights from the features stored in the feature storage unit 151 as in the first embodiment. Therefore, the feature storage unit 151 is not necessarily included in the present embodiment.

As described above, according to the first to fourth embodiments, learning accuracy of a model used for analysis of a motion of an atom and the like can be further improved.

Next, a hardware configuration of the information processing device according to the first to fourth embodiments will be described with reference to FIG. 19. FIG. 19 is an explanatory diagram illustrating a hardware configuration example of the information processing device according to the first to fourth embodiments.

The information processing device according to the first to fourth embodiments includes a control device such as a CPU 51, storage devices of a read only memory (ROM) 52, a RAM 53 and the like, a communication I/F 54 that is connected to a network and performs communication, and a bus 61 that connects each unit. A GPU may be further included as the control device.

A program executed by the information processing device according to the first to fourth embodiments is included by being incorporated in the ROM 52 or the like in advance.

The program executed by the information processing device according to the first to fourth embodiments may be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Furthermore, the program executed by the information processing device according to the first to fourth embodiments may be stored on a computer connected to a network such as the Internet and provided by being downloaded via the network. Furthermore, the program executed by the information processing device according to the first to fourth embodiments may be provided or distributed via a network such as the Internet.

The program executed by the information processing device according to the first to fourth embodiments may cause a computer to function as each unit of the information processing devices described above. In this computer, the CPU 51 can read a program from a computer-readable storage medium onto a main storage device and execute the program.

Configuration Examples of the embodiments will be described below:

Configuration Example 1

An information processing device including
    a processing unit configured to:

set an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and
learn the machine learning model using the error function.

Configuration Example 2

The information processing device according to Configuration Example 1,
    wherein the processing unit is configured to set the error function including a plurality of terms obtained by multiplying, by the plurality of weights, errors of physical quantities for the plurality of elements.

Configuration Example 3

The information processing device according to Configuration Example 1 or 2,
    wherein the processing unit is configured to:
    set the plurality of weights according to the features of the plurality of elements, and
    set the error function including the one or more terms based on the plurality of set weights.

Configuration Example 4

The information processing device according to Configuration Example 3,
    wherein the processing unit is configured to:
    aggregate numbers of atoms that are numbers of atoms of the plurality of elements included in a plurality of pieces of learning data used for learning of the machine learning model, for the plurality of elements, based on the plurality of pieces of learning data, the plurality of pieces of learning data each including positions of the plurality of atoms, and
    set the plurality of weights based on the numbers of atoms or ratios of the numbers of atoms to a total number of atoms of all elements included in the plurality of pieces of learning data.

Configuration Example 5

The information processing device according to any one of Configuration Examples 1 to 4,
    wherein the processing unit is configured to:
    receive the plurality of weights designated for the plurality of elements, and
    set the error function including the one or more terms based on the plurality of received weights.

Configuration Example 6

The information processing device according to any one of Configuration Examples 1 to 5,
    wherein the features are masses of the plurality of elements, atomic numbers of the plurality of elements, information correlated with the masses or the atomic numbers, or numbers of atoms of the plurality of elements included in the analysis target.

Configuration Example 7

The information processing device according to Configuration Example 6,
  wherein the plurality of weights are reciprocals of the plurality of features.

Configuration Example 8

The information processing device according to any one of Configuration Examples 1 to 7,
  wherein the processing unit is configured to set the error function including a plurality of terms obtained by multiplying second errors by the weights, the second errors being sums of first errors that are errors of the physical quantities of the plurality of atoms, for the plurality of elements.

Configuration Example 9

The information processing device according to Configuration Example 1,
  wherein the processing unit is configured to select one or more elements from among the plurality of elements with a probability according to magnitude of the plurality of weights, and set the error function including one or more terms obtained by multiplying weights for the selected one or more elements by errors of the physical quantities for the selected one or more elements.

Configuration Example 10

The information processing device according to Configuration Example 9,
  wherein the processing unit is configured to select the one or more elements with the probabilities for each of a plurality of pieces of learning data used for learning of the machine learning mode, and each including positions of the plurality of atoms.

Configuration Example 11

The information processing device according to Configuration Example 9,
  wherein the processing unit is configured to:
  repeatedly execute learning of the machine learning model a plurality of times using a plurality of pieces of learning data each including positions of the plurality of atoms; and
  select one or more of the plurality of elements with the probabilities for each of the plurality of times of the learning.

Configuration Example 12

The information processing device according to any one of Configuration Examples 1 to 11,
  wherein the processing unit is configured to:
  correct at least part of the plurality of weights to a designated value, and
  set the error function including one or more terms based on the plurality of weights after correction.

Configuration Example 13

The information processing device according to Configuration Example 12, wherein the processing unit is configure to:
  output an output value of the error function; and
  correct at least part of the plurality of weights to a value designated according to the output output value.

Configuration Example 14

The information processing device according to any one of Configuration Examples 1 to 13,
  wherein the processing unit is configured to correct a parameter of the machine learning model such that an output value of the error function is made small.

Configuration Example 15

The information processing device according to any one of Configuration Examples 1 to 14,
  wherein the processing unit includes:
    a function setting unit configured to set the error function; and
    a learning unit configured to learn the machine learning model.

Configuration Example 16

An information processing method executed by an information processing device, including:
  setting an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and
  learning the machine learning model using the error function.

Configuration Example 17

A program for causing a computer to execute:
  setting an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and
  learning the machine learning model using the error function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An information processing device comprising
  one or more hardware processors configured to:

set an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and learn the machine learning model using the error function, wherein the one or more hardware processors are configured to set the error function including a plurality of terms obtained by multiplying, by the plurality of weights, errors of physical quantities for the plurality of elements.

2. The device according to claim 1, wherein the one or more hardware processors are configured to:

set the plurality of weights according to the features of the plurality of elements, and set the error function including the one or more terms based on the plurality of set weights.

3. The device according to claim 2, wherein the one or more hardware processors are configured to:

aggregate numbers of atoms that are numbers of atoms of the plurality of elements included in a plurality of pieces of learning data used for learning of the machine learning model, for the plurality of elements, based on the plurality of pieces of learning data, the plurality of pieces of learning data each including positions of the plurality of atoms, and set the plurality of weights based on the numbers of atoms or ratios of the numbers of atoms to a total number of atoms of all elements included in the plurality of pieces of learning data.

4. The device according to claim 1, wherein the one or more hardware processors are configured to:

receive the plurality of weights designated for the plurality of elements, and set the error function including the one or more terms based on the plurality of received weights.

5. The device according to claim 1, wherein the features are masses of the plurality of elements, atomic numbers of the plurality of elements, information correlated with the masses or the atomic numbers, or numbers of atoms of the plurality of elements included in the analysis target.

6. The device according to claim 5, wherein the plurality of weights are reciprocals of the plurality of features.

7. The device according to claim 1, wherein the one or more hardware processors are configured to set the error function including a plurality of terms obtained by multiplying second errors by the weights, the second errors being sums of first errors that are errors of the physical quantities of the plurality of atoms, for the plurality of elements.

8. The device according to claim 1, wherein the one or more hardware processors are configured to select one or more elements from among the plurality of elements with a probability according to magnitude of the plurality of weights, and set the error function including one or more terms obtained by multiplying weights for the selected one or more elements by errors of the physical quantities for the selected one or more elements.

9. The device according to claim 8, wherein the one or more hardware processors are configured to select the one or more elements with the probabilities for each of a plurality of pieces of learning data used for learning of the machine learning mode, and each including positions of the plurality of atoms.

10. The device according to claim 8, wherein the one or more hardware processors are configured to:

repeatedly execute learning of the machine learning model a plurality of times using a plurality of pieces of learning data each including positions of the plurality of atoms; and select one or more of the plurality of elements with the probabilities for each of the plurality of times of the learning.

11. The device according to claim 1, wherein the one or more hardware processors are configured to:

correct at least part of the plurality of weights to a designated value, and set the error function including one or more terms based on the plurality of weights after correction.

12. The device according to claim 11, wherein the one or more hardware processors are configure to:

output an output value of the error function; and correct at least part of the plurality of weights to a value designated according to the output output value.

13. The device according to claim 1, wherein the one or more hardware processors are configured to correct a parameter of the machine learning model such that an output value of the error function is made small.

14. The device according to claim 1, wherein the one or more hardware processors are configured to implement:

a function setting unit configured to set the error function; and a learning unit configured to learn the machine learning model.

15. An information processing method executed by an information processing device, comprising:

setting an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and learning the machine learning model using the error function; and wherein the setting the error function including a plurality of terms obtained by multiplying, by the plurality of weights, errors of physical quantities for the plurality of elements.

16. A computer program product comprising a non-transitory computer-readable medium including programmed instructions, the instructions causing a computer to execute:

setting an error function including one or more terms based on a plurality of weights according to features of a plurality of elements, the error function being a function used during learning of a machine learning model into which positions of a plurality of atoms included in an analysis target, and information indicating which of the plurality of elements the plurality of atoms are, are input, and that outputs a physical quantity of the analysis target; and learning the machine learning model using the error function; and wherein the setting the error function including a plurality of terms obtained by multiplying, by the plurality of weights, errors of physical quantities for the plurality of elements.

* * * * *